United States Patent Office 3,736,320
Patented May 29, 1973

3,736,320
METHOD OF PREPARING HEXAHYDRO-
1,3,5-TRIACYL-s-TRIAZINES
George A. Karustis, Jr., Westfield, N.J., assignor to
GAF Corporation, New York, N.Y.
No Drawing. Filed Aug. 17, 1970, Ser. No. 64,573
Int. Cl. C07d 55/14
U.S. Cl. 260—248 NS
13 Claims

ABSTRACT OF THE DISCLOSURE

A process is provided for the preparation of hexahydro-1,3,5-triacyl-s-triazines having the structural formula:

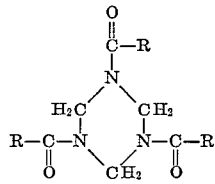

wherein R is a lower aliphatic hydrocarbon radical or a halogenated lower aliphatic hydrocarbon radical comprising reacting a polymeric formaldehyde, a lower aliphatic anhydride and a lower aliphatic or halogenated lower aliphatic nitrile in the presence of a catalytically effective amount of an aryl sulfonic acid containing from about 0.5 to about 7.0% sulfuric acid and from 0 to about 10% water, and thereafter recovering the resulting product.

---

This invention relates to an improved method for the preparation of hexahydro-1,3,5-triacyl-s-triazines. More particularly, this invention relates to an improved catalytic method for the preparation of stable hexahydro-1,3,5-triacyl-s-triazines in high yields and in a controllable manner.

The hexahydro-1,3,5-triacyl-s-triazines are well known compounds. Those with reactive acyl groups are useful as crosslinking agents and hardeners. For example, hexahydro-1,3,5-triacrylyl-s-triazine has been used for, among other things, a gelatin hardener in photographic emulsions. Generally, such triazine compounds have heretofore been prepared by reaction of aliphatic nitriles with a polymeric formaldehyde such as paraformaldehyde or trioxane and an aliphatic anhydride in the presence of a sulfuric acid catalyst either neat or employing an inert, organic diluent. Unfortunately, this prior method has proven unsatisfactory for commercial usage because an unpredictable and rather long induction period is associated with the reaction and, upon scale-up, the reaction has been found to be uncontrollable and quite violent. Moreover, the resulting triazine products have been obtained in low yield and have been characteristically of poor quality, contaminated with large amounts of by-product polymer and have exhibited poor storage stability.

Accordingly, it is an object of the present invention to provide methods for the preparation of hexahydro-1,3,5-triacyl-s-triazines which overcome the above-noted deficiencies.

It is another object of this invention to provide hexahydro-1,3,5-triacyl-s-triazines exhibiting physical and chemical properties superior to those heretofore obtained.

These as well as other objects are accomplished by the present invention, which provides a process for the preparation of hexahydro-1,3,5-triacyl-s-triazines having the structural formula:

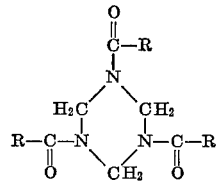

wherein R is a lower aliphatic hydrocarbon radical or a halogenated lower aliphatic hydrocarbon radical, comprising reacting a polymeric formaldehyde, a lower aliphatic anhydride and a lower aliphatic or halogenated lower aliphatic nitrile in the presence of a catalytically effective amount of an aryl sulfonic acid containing from about 0.5 to about 7.0% sulfuric acid and from about 0 to about 10% water, and thereafter recovering the resulting product.

It has been found that the process of the present invention enables the obtainment of stable hexahydro-1,3,5-triacyl-s-triazines in high yields without the advent of an induction period and in a conveniently controllable and nonviolent manner.

Any polymeric form of formaldehyde can be suitably employed, such as paraformaldehyde or trioxane. Preferably, trioxane is employed. The amount of polymeric formaldehyde employed is not narrowly critical and can vary from about 50 to about 70 parts per 100 parts aliphatic nitrile.

The presence of a lower aliphatic anhydride has been found necessary to the success of the present invention. The selection of a particular aliphatic anhydride is not considered critical and any anhydride which is a liquid and soluble in the reaction medium under the reaction conditions can be suitably employed. Preferably, aliphatic anhydrides wherein the aliphatic radical contains from 1 to about 4 carbon atoms can be employed. For example, acetic anhydride, propionic anhydride and the like have been found useful. The amount of aliphatic anhydride employed is not considered critical and can vary from about 5 to about 35 parts per 100 parts aliphatic nitrile.

The determination of the particular acyl groups in the triazine product is governed by the selection of the lower aliphatic or halogenated lower aliphatic nitrile employed. Any lower aliphatic or halogenated lower aliphatic nitrile wherein the aliphatic radical contains from 1 to about 4 carbon atoms and the halogen is chlorine, bromine, iodine or fluorine can be suitably employed. For example, acetonitrile, acrylonitrile, methacrylonitrile, propionitrile, butyronitrile, chloroacetonitrile, chloropropionitrile, chlorobutyronitrile and the like and mixtures thereof have been found useful.

It has been found in accordance with the present invention that essentially all of the deficiencies associated with the prior methods of preparing the triazine compounds described herein can be avoided by substituting for the sulfuric acid catalyst heretofore employed a catalytically effective amount of a non-dehydrating, nonoxidizing aryl sulfonic acid containing from about 0.5 to about 7.0% sulfuric acid and from 0 to about 10% water. Surprisingly, it has been found that use of a pure aryl sulfonic acid, per se, is essentially ineffective in overcoming the problems associated with the use of sulfuric acid. In order for an aryl sulfonic acid to effectively function as a catalyst, it must contain from about 0.5 to about 7.0% $H_2SO_4$. Attempts to conduct the reaction with the corresponding amounts of $H_2SO_4$ in the absence of an aryl sulfonic acid have been unsuccessful. Although the presence of water is not necessary in attaining the effective catalytic action afforded by the catalyst system of the present invention, it has been found that from 0 to about 10% water can be present in the catalyst system without substantially adversely affecting the yield of products obtained. Surprisingly, best results are obtained when from 0 to about 2.5% water is employed in the catalyst system. Suitable aryl sulfonic acids are, for example, benzene sulfonic acid, p-toluene sulfonic acid, m-nitrobenzene sulfonic acid, naphthalene sulfonic acids, 2,4-dimethyl-benzene sulfonic acid and the like.

The amount of catalyst employed is not considered critical. It has been found that use of the catalyst in amounts ranging from about 1 to about 10 parts per 100 parts of aliphatic nitrile is generally sufficient to obtain the benefits of the present invention. Of course, larger or smaller amounts of the catalyst can be employed, if desired.

Since the aliphatic nitriles and anhydrides employed are generally liquid at the reaction conditions, use of an inert organic solvent or diluent is optional, although preferred. Illustratively, aromatic or chlorinated aliphatic or aromatic solvents, as for example toluene, xylene, carbon tetrachloride, ethylene dichloride, chlorobenzene and the like and especially benzene, have been found useful.

The order of addition of the reactants and catalyst is not considered critical and any convenient order of addition may be employed. For example, the catalyst may be added to a mixture of the reactants or a solution of the catalyst and an aliphatic nitrile may be added to a solution of trioxane and an aliphatic anhydride. Preferably, however, a solution of trioxane or paraformaldehyde and an aliphatic anhydride, either neat or with an inert organic diluent, is added to a refluxing solution of the catalyst and an aliphatic nitrile.

After the reaction has proceeded for a sufficient period of time to insure complete reaction, generally about 1 to about 5 hours at the reflux temperature, the reaction mixture is cooled and the product triazine is recovered by filtration or the like and is then dried. The resulting triazine products can then be used with or without further treatment.

The following examples further illustrate the methods of the present invention. All parts and proportions referred to herein and the appended claims are by weight unless otherwise indicated.

EXAMPLE 1

To a 5 liter four-necked flask equipped with stirrer, reflux condenser, thermometer and addition funnel, is charged 1160 ml. acrylonitrile and 74 g. of commercial grade p-toluene sulfonic acid containing 1.8% by weight of sulfuric acid and 2.2% by weight water. The resulting solution is heated to reflux. To the refluxing solution is added a solution of 1220 ml. benzene, 450 g. trioxane and 122 ml. acetic anhydride over a one hour period at a rate sufficient to maintain reflux. After refluxing for 3 hours, the solution is cooled, filtered, washed twice with 550 ml. benzene and air dried. The product, hexahydro-1,3,5-triacrylyl-s-triazine, is free of polymer, substantially pure and useful as a gelatin hardener if desired after further recrystallization or other treatment. The product is obtained in an amount of 848 g. (68% of theory).

EXAMPLE 2

The procedure employed in Example 1 is repeated using paraformaldehyde in lieu of trioxane. Essentially equivalent results are obtained.

EXAMPLE 3

Hexahydro-1,3,5-triacetyl-s-triazine is prepared employing the procedure described in Example 1 and substituting acetonitrile in lieu of acrylonitrile.

EXAMPLE 4

Hexahydro-1,3,5-methacrylyl-s-triazine is prepared employing the procedure described in Example 1 and substituting methacrylonitrile in lieu of acrylonitrile.

EXAMPLE 5

Hexahydro - 1,3,5-trichloroacetyl-s-triazine is prepared employing the procedure described in Example 1 and substituting chloroacetonitrile in lieu of acrylonitrile.

Table I illustrates the critical nature of the catalyst system. In particular, the examples in the table demonstrate the necessity for the inclusion of a small amount of $H_2SO_4$ which amount, in itself, is insufficient to catalyze the reaction. Also demonstrated are the benefits derived from careful regulation of the amount of water when it is employed.

Employing the procedure described in Example 1, hexahydro-1,3,5-triacrylyl-s-triazine is prepared using a variety of catalyst systems. The catalyst systems and the results obtained are summarized in Table I below:

TABLE I

| Example | Catalyst composition, percent | | | Parts catalyst per 100 parts nitrile | Yields of hexahydro-1,3,5-triacyl-s-triazine (percent of theory) |
|---|---|---|---|---|---|
| | p-Toluene-sulfonic acid | $H_2SO_4$ | $H_2O$ | | |
| A | 100 | 0 | 0 | 9.6 | 0 |
| B | 0 | 100 | 0 | 0.1 | 0 |
| C | 0 | 100 | 0 | 0.35 | 0 |
| D | 0 | 100 | 0 | 0.75 | 0 |
| 6 | 96.5 | 3.5 | 0 | 9.6 | 67 |
| 7 | 98.2–99.0 | 1.0–1.8 | 0 | 9.6 | 64 |
| 8 | 96.75–97.55 | 1.0–1.8 | 1.45 | 9.6 | 68 |
| 9 | 96.0 | 1.8 | 2.2 | 9.6 | 68 |
| 10 | 96.0 | 1.8 | 2.2 | 4.8 | 41 |
| 11 | 96.0 | 1.8 | 2.2 | 2.4 | 17 |
| 12 | 93.85–94.55 | 1.0–1.8 | 4.35 | 9.6 | 54 |
| 13 | 90.95–91.75 | 1.0–1.8 | 7.25 | 9.6 | 32 |
| 14 | 88.73–89.53 | 1.0–1.8 | 9.47 | 9.6 | 13 |

Although specific materials and conditions were set forth in the above exemplary processes for preparing the hexahydro-1,3,5-triacyl-s-triazines of this invention, these are merely intended as illustrations of the present invention. Various other reactants, catalysts, solvents and reaction conditions such as those described herein may be substituted in the examples with similar results.

Other modifications of the present invention will occur to those skilled in the art upon a reading of the present disclosure. These are intended to be included within the scope of this invention.

What is claimed is:

1. In the process for the preparation of hexahydro-1,3,5-triacyl-s-triazines having the structural formula:

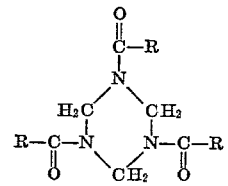

wherein R is a lower aliphatic hydrocarbon radical or a halogenated lower aliphatic hydrocarbon radical by reaction of a polymeric formaldehyde with a lower aliphatic or halogenated lower aliphatic hydrocarbon nitrile in the presence of a lower aliphatic hydrocarbon anhydride and an acid catalyst, the improvement comprising employing as catalyst a catalytically effective amount of a benzene or naphthalene sulfonic acid containing about 0.5 to about 7.0% of sulfuric acid and 0 to about 10% of water.

2. Process as defined in claim 1 wherein the polymeric formaldehyde is paraformaldehyde or trioxane.

3. Process as defined in claim 1 wherein the lower aliphatic anhydride contains an aliphatic radical containing from 1 to about 4 carbon atoms.

4. Process as defined in claim 3 wherein the lower aliphatic anhydride is acetic anhydride.

5. Process as defined in claim 1 wherein the lower aliphatic or halogenated lower aliphatic nitrile contains an aliphatic radical containing from 1 to about 4 carbon atoms.

6. Process as defined in claim 5 wherein said aliphatic nitrile is acetonitrile.

7. Process as defined in claim 5 wherein said aliphatic nitrile is acrylonitrile.

8. Process as defined in claim 5 wherein said aliphatic nitrile is methacrylonitrile.

9. Process as defined in claim 1 wherein the catalyst is present in amounts varying from about 1 to about 10 parts per 100 parts of said aliphatic nitrile.

10. Process as defined in claim 1 wherein the catalyst is p-toluene sulfonic acid containing from about 0.5 to about 7.0% sulfuric acid and from 0 to about 10% water.

11. Process as defined in claim 10 wherein from 0 to about 2.5% water is employed.

12. Process as defined in claim 1 wherein an inert organic solvent is employed.

13. Process as defined in claim 1 wherein the reaction is conducted at the reflux temperature of the reaction mixture.

References Cited

UNITED STATES PATENTS

| | | | |
|---|---|---|---|
| 2,434,230 | 1/1948 | Schiessler et al. | 260—248 |
| 2,651,631 | 9/1953 | Zerner et al. | 260—248 |

JOHN M. FORD, Primary Examiner